Jan. 19, 1971  W. E. THORNTON  3,555,886
NONGRAVIMETRIC MASS DETERMINATION SYSTEM
Filed May 20, 1968  3 Sheets-Sheet 1

INVENTOR.
WILLIAM THORNTON
BY Harry A. Herbert Jr
and Arsen Tashjian
ATTORNEYS

United States Patent Office 3,555,886
Patented Jan. 19, 1971

3,555,886
NONGRAVIMETRIC MASS DETERMINATION SYSTEM
William E. Thornton, San Antonio, Tex., assignor to the United States of America as represented by the Secretary of the Air Force
Filed May 20, 1968, Ser. No. 730,461
Int. Cl. G01g 3/16
U.S. Cl. 73—67.2                             4 Claims

ABSTRACT OF THE DISCLOSURE

A non-gravimetric mass measurement system having a support structure for holding a mass to be "weighed" attached to an oscillating spring assembly. A device for indicating precisely when the oscillating mass crosses point of zero displacement produces a signal which is sent to a counter for determining the time period. A substantially frictionless air bearing serves to restrain the motion of the oscillating mass to a single axis under zero gravity conditions in space while serving to support the weight on earth.

BACKGROUND OF THE INVENTION

This invention relates to a means for the determination of mass independently of gravitational forces and, more particularly, the invention is concerned with providing a precise means for determining the period of oscillation of an oscillating mass and linear spring arrangement which varies in proportion to the change in mass.

One of the problems encountered by man as he extends his ability to stay in outer space for longer time periods is the effect of long term exposure of the human body to zero gravity conditions. It has been found that there generally occurs a loss of body weight which corresponds to the length of time in the space environment. This weight change may be caused by loss of fluid by diuresis during the first days of weightlessness and by atrophy resulting from the decreased use of certain muscles during the long periods spent in the confining conditions in space capsules. Exercise procedures are necessary to counteract loss of muscle mass and to return the body exercise level to normal in order to prevent this disuse atrophy. The change in weight of the human body in the space environment is the most valuable indicator of the physical condition of the astronaut. Thus, an accurate and precise system for measuring the body mass at zero gravity is needed to determine the effectiveness of exercise procedures which are introduced to counteract loss of muscle mass and to control intake of fluids.

SUMMARY OF THE INVENTION

The present invention is primarily concerned with the provision of a system for accurately determining the mass and corresponding equivalent earth weight of various objects in space including the weight of the human body. In the practice of the invention the man or object whose mass is to be determined is rigidly attached to a supporting structure which allows linear motion along only one axis. Elastic restoring forces are applied to the mass and supporting structure such that when it is displaced and released, simple, virtually undamped harmonic motion ensures. A device to determine precisely when the oscillating mass crosses the point of zero displacement and a counter for determining the time period of the oscilating mass are included in the system. Also, some means for providing displacement along a given axis and a bearing to restrain the motion to this axis only are required. The bearing is capable of supporting the weight on earth while operating in space under zero gravity conditions without adding appreciable friction.

Accordingly, it is an object of the invention to provide a system for precisely determining the change in mass and corresponding change in weight of an object such as a living human body under conditions of weightlessness encountered in outer space.

Another object of the invention is to provide a system for determining the change in mass of an object by measuring the oscillating frequency variation of the object and the supporting structure upon which it is mounted.

Still another object of the invention is to provide a mass measuring system suitable for use under non-gravitational conditions wherein an oscillating spring-mass and counter arrangement is utilized to achieve a determination of the change in mass based upon the period of oscillation which varies as a function of mass.

A further object of the invention is to provide a mass measurement system which allows true translatory motion and yields the ultimate in accuracy. Weight measurement and/or weight changes on the order of 0.1.% can be determined by use of the present invention.

A still further object of the invention is to provide a mass measurement system which operates at extremely low amplitudes of oscillation. A zero-crossing detector which is sufficiently sensitive to movements of a few micro-inches allows amplitudes of oscillation on the order of 0.2 inch.

Another further object of the invention is to provide a mass measurement system in outer space which requires a smaller operating area because of low amplitudes of oscillation and prevents the creation of G forces in the spacecraft. Also, wind resistance and associated effects which lend to the possibility of errors are eliminated by the low velocity and amplitude of the oscillations.

These and other objects, features and advantages will become more apparent after considering the description that follows and from the drawings wherein like numbers are used throughout to identify like elements.

DESCRIPTION OF THE DRAWINGS

In the drawings:
FIG. 7 is a schematic representation of one exemplary instrumental arrangement of the mass measurement system according to the invention.

DESCRIPTION OF THE PREFERRED EMBODIMENTS

Virtually all of the mass measurements made on earth are comparisons of forces produced by a standard and unknown masses attracted by the earth's ubiquitous gravitational field. In the absence of or compensation of this field, such as occurs in orbital or space flight, some other means must be used to obtain the mass of unknown objects.

Figure 1:
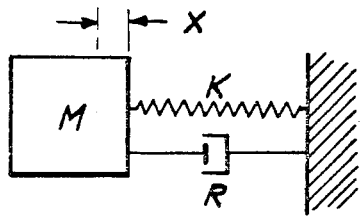
FIG. 1 is a schematic illustration of a simple mass and spring system.

The present invention provides an accurate and precise system for accomplishing mass determination and is based on the combination of the mass into a linearly oscillating spring and mass pendulum. An idealized depiction of the system is shown in FIG. 1 wherein the mass, M, moves in the X direction with the spring, K, and the resistance, R, forces acting. The general equation for such a system is:

$$\frac{M d^2 X}{dt} + \frac{R dX}{dt} + KX = 0$$

The solution of this equation in terms of the period (time) of one oscillation is:

$$T = 2\pi \sqrt{\frac{M}{K}}$$

where: T=time
K=spring constant
M=mass

It is assumed that $R = 0$ and an initial displacement in X was made and the mass released without further disturbance.

Under these conditions, mass may be determined from:

$$M = \frac{T^2 K}{4\pi^2}$$

If the spring constant is not known, it may be determined by calibration with a known mass.

In a real system $R \neq 0$ for there will be resistance losses associated with the spring, air resistance, and with any bearing system which may be required. These resistance losses will have two effects: (1) the period of oscillation will be changed and (2) the oscillation amplitude will be reduced in a logarithmic fashion. In an acceptable system, the resistance losses should be small enough to produce negligible errors in period when compared with other errors. The decrease in amplitude is of no concern so long as the zero-crossing detector is placed at the point of zero displacement.

Figure 2:
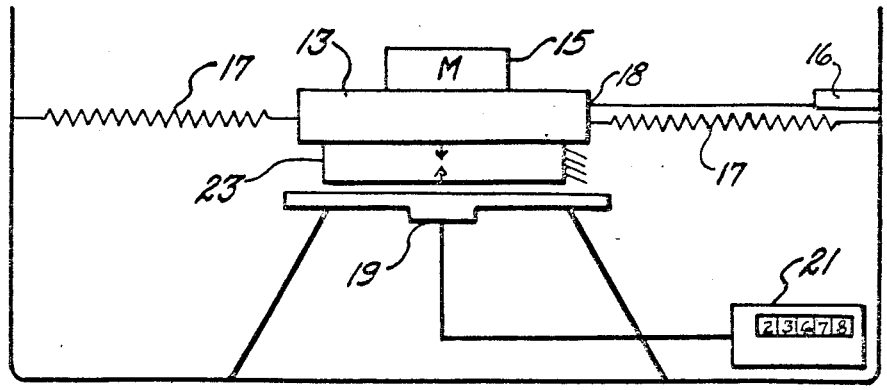
FIG. 2 is a schematic representation of the basic principle of the system for measurement of mass employed in the present invention.

Referring now to FIG. 2, a working system, according to the invention, includes a support structure 13 to hold the mass 15 to be "weighed," a spring assembly 17, a device 19 to determine precisely when the oscillating mass crosses point of zero displacement, a counter 21 for determining time periods, some means 16, for example, a drum and cable with a quick disconnect at 18, for providing displacement along a given axis, and a bearing 23 to restrain the motion to a single axis and on earth to support the weight without adding appreciable friction. A practical realization of the scheme imposes many considerations of the operation and arrangement as do the severe limitations imposed by space flight.

Some of these considerations are: Motion of the mass to be measured should be restricted to the minimum degrees of freedom or linear motion along a single axis. This motion should be of low amplitude and velocity especially in the case of non-rigid masses including man. This implies a high resolution zero-crossing detector.

The realization of such a mass measurement system is shown schematically in FIG. 2. A linear air bearing 23 supports the weight under gravity and restricts the motion to a single axis. Such an air bearing provides a device of low enough mechanical resistance to be used in such an application. The movable portion of the bearing also supports the masses to be measured. To this portion of the device a pair of precision springs 17 are attached in "pullpull" fashion. These springs must have carefully controlled characteristics to obtain the required degree of accuracy. The zero-crossing detector 19 is an electro-optical arrangement which provides a distance resolution better than $5 \times 10^{-5}$ inches without loading the bearing.

Figure 3:
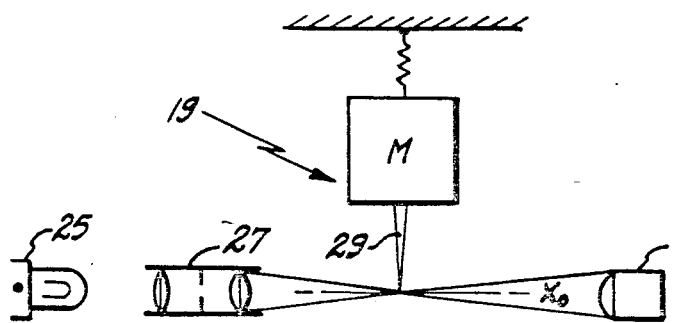
FIG. 3 is a schematic illustration of the optical arrangement of the zero-crossing detector.

In FIG. 3, there is shown schematically a detailed illustration of the zero-crossing detector 19. An incandescent bulb 25 illuminates a slit in the optic tube 27 assembly which is then focussed as a vertical ribbon of light .001 inch wide by approximately .1 inch high at $X_0$. A knife edge 29 is attached to the oscillating mass M and moves across the axis X. At all points above $X_0$ the photo electric cell 31 is illuminated fully and provides a maximum light output. At $X_0$ the light is cut off in .001 inch and remains off when the mass is below this point. The system thus has an inherent accuracy of .001 inch.

Figure 4:
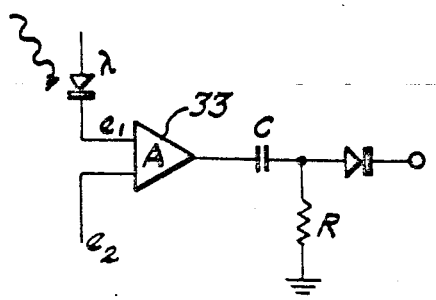
FIG. 4 is a simplified zero-crossing detector circuit.

This basic accuracy of .001 inch is further enhanced by the electronic circuitry shown in FIG. 4 as follows: The voltage $e_1$ is the output of the photocell while $e_2$ is fixed at ½ the maximum voltage of $e_1$. A stable high gain differential amplifier 33 provides an output of approximately 20 volts for a 1 mv. difference between $e_1$ and $e_2$.

The slope of the photo electric cell 31 output is several volts/$10^{-3}$ inches as the knife edge 29 crosses the light beam. This results in a theoretical resolution of microinches. Practically there is some motion in other planes with defocussing and other effects. The output of the zero-crossing detector 19 must then be converted to signals controlling the timer. The simple R.C. differentiator shown will generate a pulse each time zero is crossed. Since zero is crossed twice each cycle and from alternately opposite directions, only pulses of a single polarity will be passed to the counter which will then count every other complete cycle.

The timer used may be a commercial unit with 1 microsecond resolution. A sear mechanism (not shown) releases the mass from a maximum displacement of ⅜ inch for a total peak to peak amplitude of ¾ inch. The release must be carefully performed to prevent introduction of transient forces into the oscillator which would transiently alter the oscillation frequency. One arrangement which would produce the desired effect is a spring loaded sear which is a face hardened and carefully ground wedge removed from a larger diameter, face hardened and ground circle attached to the oscillator. An air supply and regulator for the translatory air bearing 23 completes the arrangement which is shown schematically in FIG. 7.

MODE OF OPERATION OF THE INVENTION

Operation consists of releasing the mass from a small displacement and automatically timing a number of cycles. By taking the mode of several cycles, extraneous vibration and other error producing effects are reduced.

Figure 5:
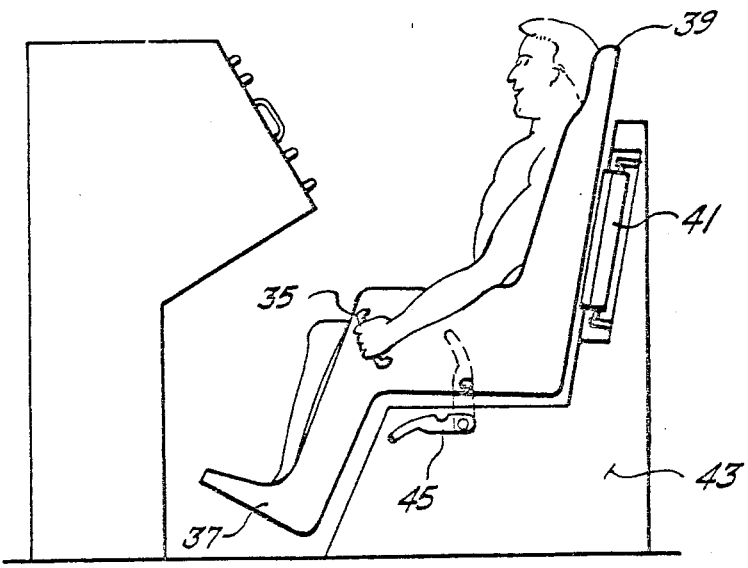
FIG. 5 is a view in side elevation of a modified crew position seat for use in mass determination.
Figure 6:
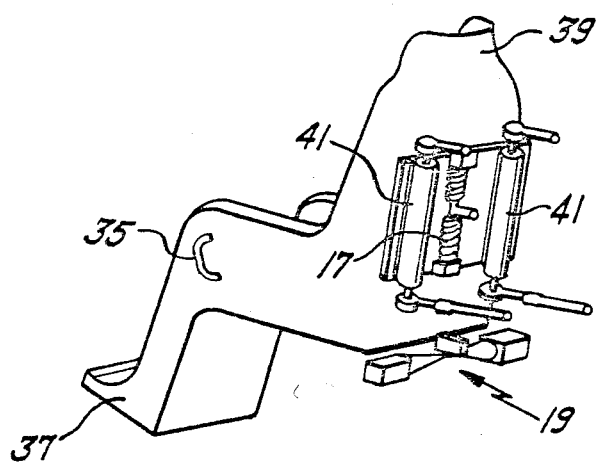
FIG. 6 is a perspective view showing details of the mass measurement equipment of the crew seat of FIG. 5.
Figure 1:
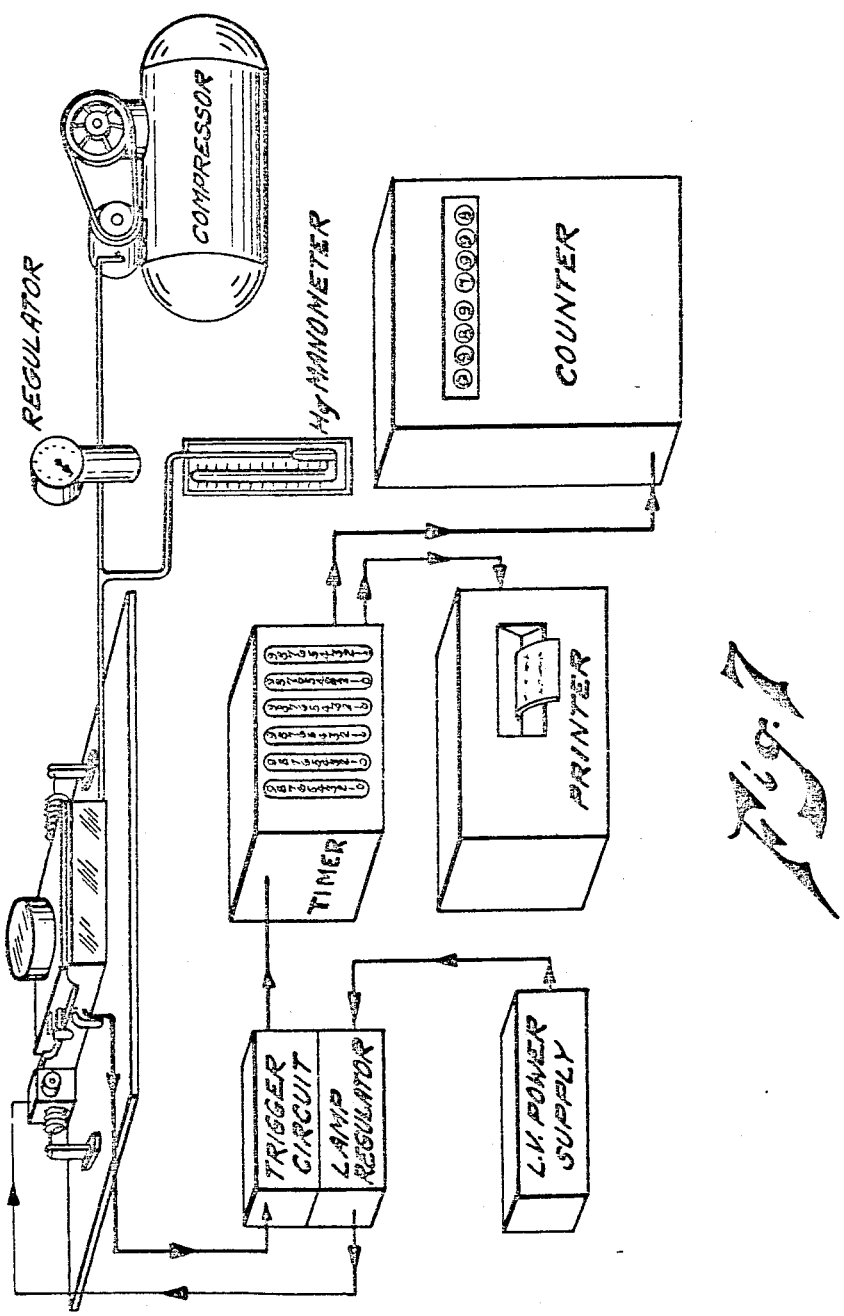

A somewhat more complex requirement for this system is measurement of man's mass in space. The problem here is a rigid combination of the flexible body of man into an oscillating system. FIGS. 5 and 6 show an apparatus for investigation of these problems. It follows the arrangement shown and also includes a crew seat having a pair of handles 35, foot board 37, and head rest 39 to allow contraction of the body's musculature both to stiffen the body and provide rigid attachment to the scale.

For practical utilization, this device must be capable of performance under space conditions. These conditions include severe limitations on size, weight, power, complexity (particularly of operation) as well as a variety of environmental conditions including vibration and G loading during powered flight, sub-normal atmospheric pressure and possible unusual atmospheric composition.

The oscillating mass scheme lends itself well to such conditions. The condition of weightlessness will be an asset. The only bearings required under zero G are to restrain small forces from deviating the mass out of the desired axis of oscillation. A small pair of cylindrical air bearings 41 operating with 1–2 p.s.i. are all that should be required. The air flow rate will also be low such that a small bleed from a bottle containing atmospheric gases or a small pump would be needed for the brief period of measurement. The reduced atmospheric pressure with its lowered viscosity will also be an asset.

In the case of mass determination of the crew, a modification of a normal crew position seat may be used as shown in FIGS. 5 and 6. During lift off and normal periods, the movable portion of the seat will be clamped to the rigid structure 43 contiguous with the ship by means of the handle 45. The spring assembly on the back which is positioned between the seat and rigid structure 43 operates to suspend the seat on the rigid structure 43 and will also be unloaded by the handle 45. For mass determination, with the handle 45 in a clamped position, the spring will be placed in tension and when the seat is unclamped by release of the handle 45 it is allowed to be displaced upward a short distance. The crew member will grasp the side handles 35 and exert pressure against the foot board 37 to provide body rigidity and firm attachment to the seat.

A small, less than one inch, displacement will be made and a few cycles of oscillation will take place along the axis of the twin air bearings 41 restraining seat to ship. An optical pickoff will count the zero-crossings and electronic circuitry will time this for display or recording.

The weight cost of this will be small, a few pounds maximum. Additional space required will be minimal. The zero-crossing detector and counter are simple electronic devices and will likewise cause little penalty. An on-board precision oscillator for the tape recorder could also supply the timing frequency but this too is small and simple. The information may be in binary form for direct recording. The power requirement would be a few watts and then only for the period of oscillation.

The foregoing seat arrangement for mass determination is exemplary of one method. Since man generates three forces, (a) random voluntary muscular movements which may be consciously controlled and eliminated for short periods, (b) cardiovascular forces with fundamental frequencies in the order of 1 cycle per second, and (c) respiratory movements with frequencies in the range of 0.2–0.3 cycle per second, account must be taken of each force for the errors that may be produced. For example, if the seat is mounted for operation as described relative to FIG. 2, the internal restoring forces and resistance of the subject's body would cause an apparent increase in mass with increasing frequency. To minimize the error, stiffening of the body by contracting the musculature, positioning of the individual and, less desirably, mechanical restraint may be effected to aid in a control of the period and amplitude required for measurement. Reduction of the frequency of oscillation within the limits imposed by the danger of atelectasis during breath holding in an $O_2$ atmosphere (15 seconds) for only a few cycles will give adequate accuracy.

Although the invention has been illustrated in the accompanying drawings and described in the foregoing specification in terms of a preferred embodiment thereof, the invention is not limited to this embodiment or to the particular uses mentioned. It will be apparent to those skilled in the art that my invention can be practiced utilizing the disclosed mass measurement system for determining the change in mass under laboratory conditions and for various other reasons. In addition to the measurement of crew mass, there may be a number of quantitative procedures in which a small scale of high precision could provide a mass measurement much more easily than a volumetric measurement may be made. Also it should be understood that various changes, alterations, modifications, and substitutions, particularly with respect to the construction details, can be made in the arrangement of the several elements without departing from the true spirit and scope of the appended claims, for example, in place of the air bearing and spring arrangement for the support structure 13, the support structure could be supported by a vertical leaf spring at each of its two ends such that substantially translatory motion is achieved. The slight curvilinear variation from true translatory motion for low amplitude oscillations allows for sufficient accuracy for most requirements.

Having thus described my invention, what I desire to secure by Letters Patent of the United States is:

1. An apparatus for measuring mass under substantially zero gravity conditions, comprising a chair-like support enabling the mass to be maintained in substantially rigid condition, a spring assembly operatively attached between said support and a fixed member, said spring assembly permitting said mass and support to oscillate as a unit, bearing means to constrain the oscillation of the mass and support along a single translatory axis parallel to the direction of said spring assembly, an optical zero-crossing detector to indicate the frequency of oscillation of said mass and support, and counter means to indicate each time the detector crosses the zero position, said counter means operating to determine the period of oscillation, thereby indicating the natural frequency of the mass and support which varies in proportion to the change in weight of the mass.

2. The apparatus for measuring mass defined in claim 1 wherein the bearing means for constraining the oscillation of the mass to a single translatory axis includes a plurality of air bearings positioned between the support with the attached mass and the fixed member, said air bearings being substantially frictionless under zero gravity conditions.

3. The apparatus for measuring mass defined in claim 1 wherein said optical zero-crossing detector includes a light source, a photosensitive element in optical alignment with said light source and a knife edge attached to the mass and positioned to interrupt the beam from said light source each time the mass oscillates thereby causing a correspondingly intermittent signal to be emitted by said photosensitive element.

4. The apparatus for measuring mass defined in claim 1 wherein said spring assembly includes a plurality of coil springs having a known spring constant, at least one of said springs being mounted on said support and attached to the fixed member, another of said springs being mounted in line with and exerting a force opposite to the first mounted spring, thereby operating to allow said support to oscillate like a pendulum when displaced from equilibrium position.

References Cited

UNITED STATES PATENTS

| | | | |
|---|---|---|---|
| 2,694,310 | 11/1954 | Pounds | 73—67 |
| 2,784,588 | 3/1957 | Humble | 73—67.2X |
| 2,862,385 | 12/1958 | Woods | 73—71.6 |
| 3,319,460 | 5/1967 | Barigant | 73—67.2 |

RICHARD C. QUEISSER, Primary Examiner

JOHN P. BEAUCHAMP, Assistant Examiner

U.S. Cl. X.R.

177—210